US012086146B2

(12) United States Patent
Dangoor et al.

(10) Patent No.: US 12,086,146 B2
(45) Date of Patent: Sep. 10, 2024

(54) TABLES TIME ZONE ADJUSTER (71) Applicant: Intuit Inc., Mountain View, CA (US)

(72) Inventors: Sheer Dangoor, Ramat-Gan (IL); Yair Horesh, Kfar Sava (IL); Aviv Ben Arie, Ramat-Gan (IL); Hagai Fine, Kfar Sava (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/072,652

(22) Filed: Nov. 30, 2022

(65) Prior Publication Data

US 2024/0176787 A1     May 30, 2024

(51) Int. Cl.
    *G06F 16/2457* (2019.01)
(52) U.S. Cl.
    CPC ............... *G06F 16/24575* (2019.01)
(58) Field of Classification Search
    CPC .................................... G06F 16/24575
    See application file for complete search history.

(56) References Cited

U.S. PATENT DOCUMENTS

| 2009/0024944 | A1* | 1/2009 | Louch | G06F 9/5033 715/764 |
| 2015/0261862 | A1* | 9/2015 | Mittal | G06F 16/951 707/722 |
| 2021/0019309 | A1* | 1/2021 | Yadav | G06F 16/2428 |
| 2022/0156237 | A1* | 5/2022 | Dong | G06F 16/214 |
| 2022/0327408 | A1* | 10/2022 | Meng | G06N 3/088 |

\* cited by examiner

*Primary Examiner* — Anhtai V Tran
*Assistant Examiner* — Xiaoqin Hu
(74) *Attorney, Agent, or Firm* — Lathrop GPM LLP (57) ABSTRACT

A method includes processing a set of query texts to identify a set of expressions, where each expression references a set of columns of datetime data in a datastore. The method also includes training a statistical model to determine a distribution of the datetime data for each column that was identified. The method further includes processing the set of expressions to generate a directed graph including more than one nodes and a plurality of edges, where each node represents one of the columns or a transformation applied by one of the expressions to one of the columns. The method additionally includes generating a weight for edges of the directed graph according to a distribution of the datetime data in the columns and a usage index of a corresponding expression.

10 Claims, 5 Drawing Sheets

TABLES TIME ZONE ADJUSTER

BACKGROUND

Businesses collect huge amounts of data on their customers, markets, suppliers, and production processes. A myriad of different applications and systems generate data that flows in from online and traditional transactions systems, sensors, social media, mobile devices, and other diverse sources, where it is stored in a data lake for consumption.

Data discovery and exploration are the processes for collecting, evaluating, and analyzing this data to generate useful analytics. Data discovery includes connecting multiple data sources, cleansing, and preparing the data, sharing the data throughout the organization. Data exploration, enabled by various machine learning platforms and pattern recognition software, includes performing analysis of the data to gain insights into business processes.

Different tables in different databases contain date time columns. While the most commonly accepted format is the Coordinated Universal Time UTC, some of these columns are in Pacific Standard Time (PST) for historical reasons. Users (data scientists/analysts) are unable to determine each column's time zone beforehand. Sometimes, the table owner will inform you of the time zone of each column, but most of the time, these inconsistencies in the time formats cause errors that affect the analysis we do and the performance of our models.

SUMMARY

In general, in one aspect, one or more embodiments relate to a method. The method includes processing a set of query texts to identify a set of expressions, wherein each expression references a set of columns of datetime data in a datastore. The method also includes training a statistical model to determine a distribution of the datetime data for each column that was identified. The method further includes processing the set of expressions to generate a directed graph comprising a plurality of nodes and a plurality of edges, wherein each node represents one of the columns or a transformation applied by one of the expressions to one of the columns. The method additionally includes generating a weight for edges of the directed graph according to a distribution of the datetime data in the columns and a usage index of a corresponding expression.

In general, in one aspect, one or more embodiments relate to a system that includes a computer processor, memory, and instructions stored in the memory. The instructions are executable by the computer processor to cause the computer processor to perform a method. The method includes processing a set of query texts to identify a set of expressions, wherein each expression references a set of columns of datetime data in a datastore. The method also includes training a statistical model to determine a distribution of the datetime data for each column that was identified. The method further includes processing the set of expressions to generate a directed graph comprising a plurality of nodes and a plurality of edges, wherein each node represents one of the columns or a transformation applied by one of the expressions to one of the columns. The method additionally includes generating a weight for edges of the directed graph according to a distribution of the datetime data in the columns and a usage index of a corresponding expression.

In general, in one aspect, one or more embodiments relate to a computer program product comprising non-transitory computer-readable program code that, when executed by a computer processor of a computing system, cause the computing system to perform a method. The method includes processing a set of query texts to identify a set of expressions, wherein each expression references a set of columns of datetime data in a datastore. The method also includes training a statistical model to determine a distribution of the datetime data for each column that was identified. The method further includes processing the set of expressions to generate a directed graph comprising a plurality of nodes and a plurality of edges, wherein each node represents one of the columns or a transformation applied by one of the expressions to one of the columns. The method additionally includes generating a weight for edges of the directed graph according to a distribution of the datetime data in the columns and a usage index of a corresponding expression.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to predicting time zones for datetime data stored in a relational database. Data scientists, analysts and engineers often have difficulties when working with datetime data in relational databases, such as timestamps generated in an event-based environment. While timestamps provide an accurate record as to when an event was generated, data analysts often must guess a time zone applicable to specific columns and specific tables in the data store. For example, a time stamp may not distinguish between events generated in the Coordinated Universal Time (UTC), Pacific Standard Time (PST) or other time zone.

Embodiments of the present invention provide a method to automatically estimate time zones according to previous work performed by other users of the system. Additionally, the system applies knowledge-based heuristics regarding network traffic and local daytime business hours to derive the probable transformation that needs to be done on the different data columns to ensure data integrity.

The time zone adjuster will store every query written in the company's database (only the query, not the meta-data), will decompose its logic related to date time columns and store it in a graph-based data structure that contains the relationships between the columns or logic done on a specific column. In addition, a statistical model will be trained under the assumption that most of the people produce their financial activity during daytime under normal distribution. Once the relationship between two columns is strong enough, the time zone adjuster will notify every user who uses the column/s, recommending a predicted transformation.

Figure 1A:
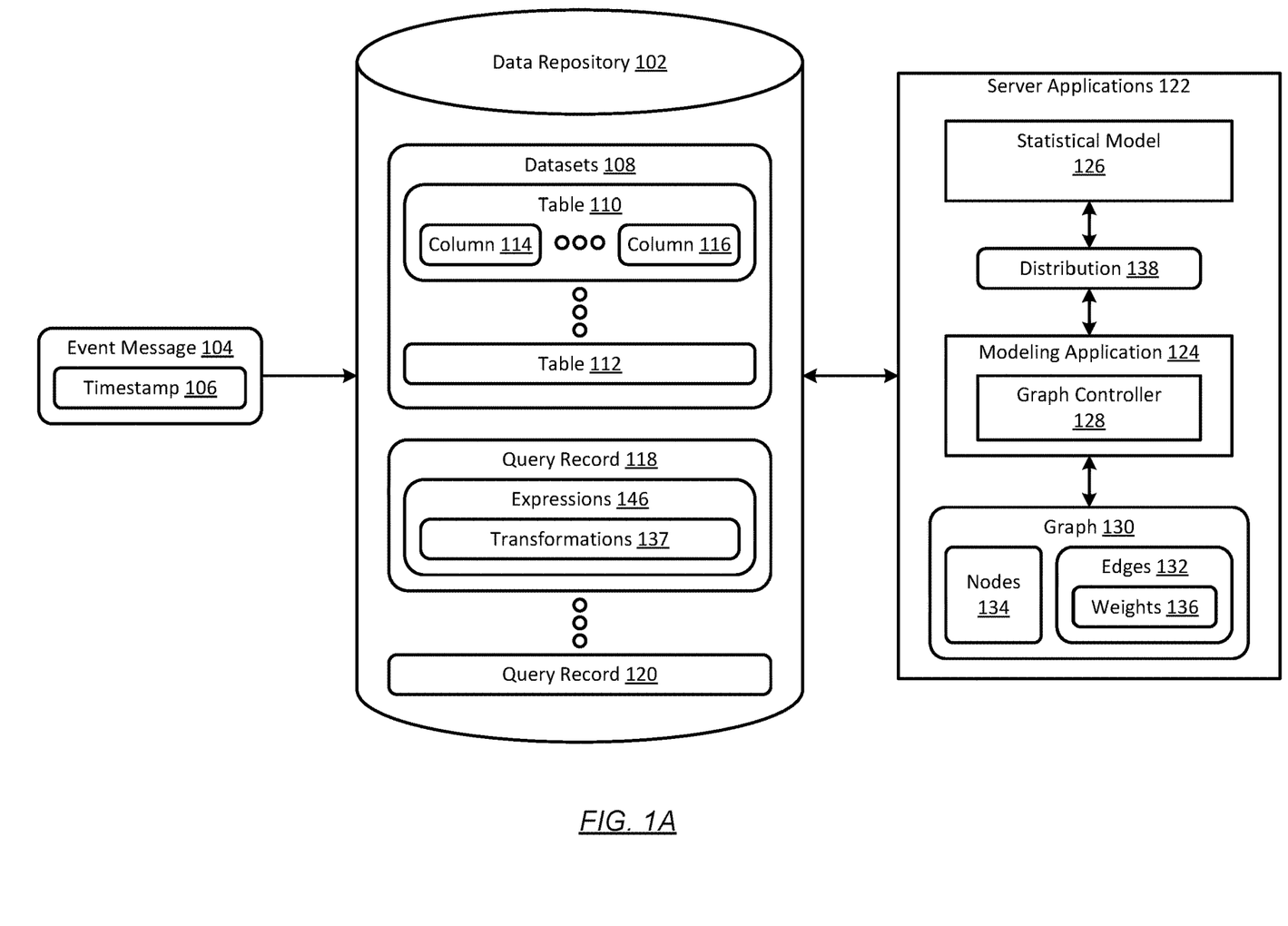
FIG. 1A shows a diagram of a system that is illustrated in accordance with one or more embodiments.

Turning to FIG. 1, a diagram of a system is illustrated in accordance with one or more embodiments. As shown in FIG. 1, the system includes a computing system (100), which is connected to a data repository (102). The computing system (100) may be, for example, the computing system described below in reference to FIG. 5A and FIG. 5B.

In some embodiments, computing system (100) may implement an event-driven software architecture and model for application design for publishing, receiving, and/or reacting to events. As used herein, an event corresponds to a standard definition as used in the art. Specifically, an event is an action or occurrence that is recognized by a software and results in an event record. An event message (104) is a record of the event that is transmitted to event listeners that listen for the particular type of event. The event message (104) includes information about the event and a timestamp (106) indicating a datetime at which the event occurred. Event messages can be stored in one or more tables of a datasets (108).

In one or more embodiments of the invention, the data repository (102) is any type of storage unit and/or device (e.g., a file system, database, data structure, or any other storage mechanism) for storing data. Further, the data repository (102) may include multiple different, potentially heterogeneous, storage units and/or devices.

The data repository (102) stores one or more datasets (108). As used herein, a dataset corresponds to a standard definition as used in the art. Specifically, a dataset is a collection of data. In the case of tabular data, a dataset corresponds to one or more database tables, where every column of a table represents a particular variable, and each row corresponds to a given record of the dataset in question. The dataset lists values for each of the variables, such as for example, height and weight of an object, for each member of the dataset.

As depicted, datasets (108) includes one or more tables (110, 112), with each table comprising one or more columns of data. For example, table (110) may store information in the event message (104), including timestamp (106) in one or more of columns (114, 116).

The data repository (102) stores one or more query records (118, 120). The query records (118, 120) are a scripted query language (SQL) statement to request information, update statement, create statement, delete statement, etc. The statement may include parameters that specify data, or data container (database, table, record, column, view, etc.), identifier(s), conditions (comparison operators), functions (e.g., join, full join, count, average, etc.), sort (e.g., ascending, descending), or others. A user, or software application, may submit a statement or query, for example, to a database management system (DBMS), which is then interpreted to access data in datasets (108). The one or more query records (118, 120) provide a record of every query submitted to access datasets (108)).

The structured text below (formatted in accordance with SQL) provide examples of query statements:

Example 1 select
   company_id,
   treatment,
   date_add(hour, +7, first_timestamp) from table_Xf
where experiment_id=yyy Example 2 select
   company_id,
   treatment,
   cast(first_timestamp) at time zone 'US Pacific' from table_Xf
where experiment_id=yyy As depicted, the computing system (100) hosts server applications (122). The server applications (122) is a collection of programs that may execute on multiple servers of a cloud environment. The server applications (122) include a modeling application (124) and a statistical model (126).

The modeling application (124) is a collection of programs that may operate on the computing system (100). Using a graph controller (128), the modeling application (124) generates a graph (130) from columns (114, 116) and query records (118, 120).

In some embodiments, the graph (130) is a directed graph in which the edges (132) identify a directional relationship between nodes (134). The nodes (134) of the graph (130) correspond to parameters identified in the query records (118, 120). For example, one or more nodes may correspond to columns (114, 116) of relevant data that are referenced by the expressions (135) in the query records. Other nodes may correspond to transformations (137) that are applied by the expressions (135). In some embodiments, multiple edges may be formed between a pair of nodes.

For each of the edges (132), the graph controller (128) generates respectively one of weights (136). The weights (136) represent relative values of edges (132) based on heuristic statistical correlations between the entities represented by the connected nodes (134). For example, in some embodiments, the weights (136) may be based on a distribution (138) of datetime data within columns (114, 116). The distribution (138) is generated by statistical model (126).

The Statistical model (126) is a collection of programs that may operate on the computing system (100). The Statistical model (126) operates on columns (114, 116) of data to determine distribution (138). In some embodiments, the statistical model (126) may be implemented as part of a machine learning platform that includes one or more machine learning models for classifying columns (114, 116) according to a distribution of data therein.

In some embodiments, the statistical model (126) is a kernel density estimation model that generates a probability density function of datetime data extracted from timestamps (106). A probability curve is calculated by weighing the distance of all the points in each specific location along the distribution. The kernel function is the specific mechanism used to weigh the points across the dataset. By adjusting the parameters of the kernel function, including bandwidth and amplitude, the shape changes the size and shape of the estimate curve can be changed.

When incorporated into machine learning platforms such as a neural network, the kernel density estimation model can train itself to correct its estimations and produce a more accurate probability density function of datetime. For example, the platform can continuously update bandwidth and amplitude estimations to increase the accuracy of the estimated probability density curve.

In some embodiments, the statistical model (126) is trained assuming a normal distribution that is skewed to a local daytime. The statistical model (126) may compare this expected distribution is then compared to distribution (138)

to determine a data shift. The graph controller (128) generates weights (136) for the edges (132) of the graph (130) based on the determined data shift. For example, the graph controller (128) may increase the weight of an edge when the data shift is aligned with the transformation applied by a corresponding expression. Conversely, the graph controller (128) may decrease the weight of the edge when the data shift is not aligned with the transformation (137) applied by a corresponding expression (146).

Figure 1B:
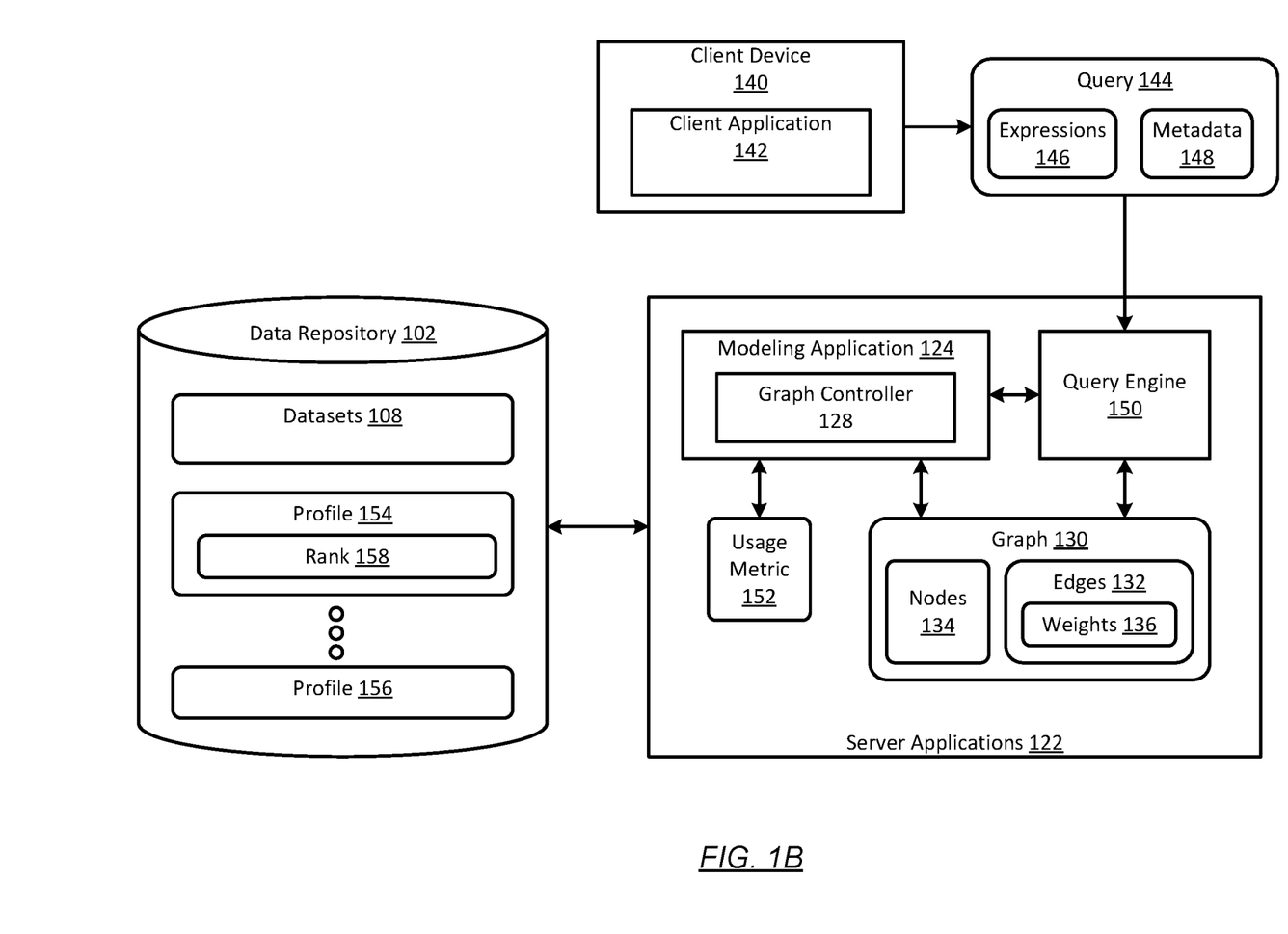
FIG. 1B shows a diagram of the system of FIG. 1A that include additional components, illustrated in accordance with one or more embodiments.
Figure 5A:
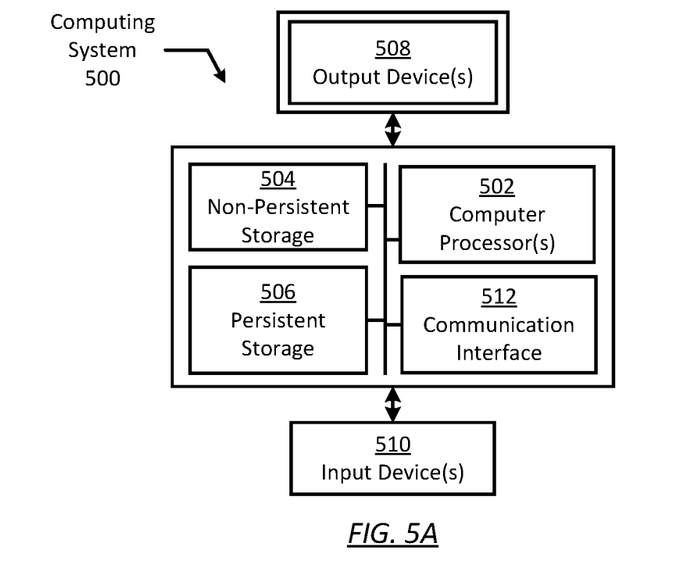
FIG. 5A and FIG. 5B shows a computing system in accordance with one or more embodiments of the invention.
Figure 5B:
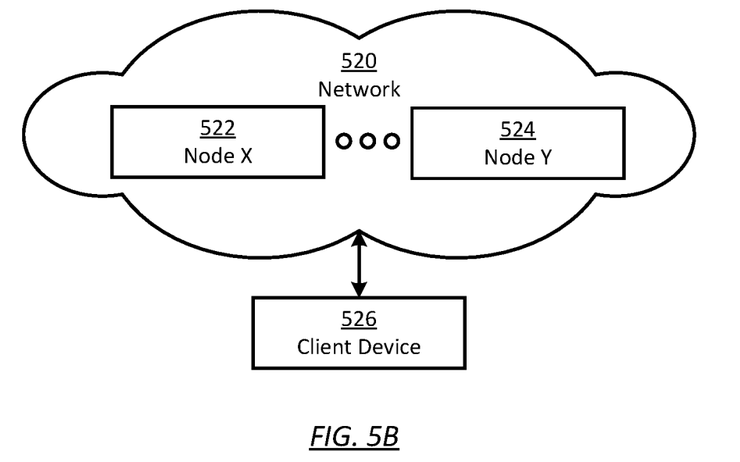

Referring now to FIG. 1B, in some embodiments, the computing system (100) may include one or more client devices (140) that is an embodiment of the computing systems of FIG. 5A and FIG. 5B. The client device (140) may be used by a user to interact with the server applications (122), such as by querying datasets (108). The client application (142) may include multiple interfaces (e.g., graphical user interfaces, application programming interfaces (API), etc.) for interacting with the server applications (122).

The client application (142) may include a web browser that accesses the server applications (122). The client application (142) may additionally be a web service that communicates with the server applications (122) using representational state transfer application programming interfaces (RESTful APIs). Although FIG. 1A and FIG. 1B show a client server architecture, one or more parts of the server applications (122) may be local applications on the client device (140) without departing from the scope of the disclosure.

Each query (144) includes both expressions (146) and metadata (148). The query engine (150) parses the query (144) to identify expressions (146), which is stored as a query record, such as one of query records (118, 120) of FIG. 1A. In some embodiments, metadata (148) may not be stored as part of the query record.

The computing system (100) may additionally include a usage metric (152) that is used in determining weights (136). Usage metrics (152) is metadata generated about expressions (146). For example, usage metrics (152) may be a counter for a number of times that a particular expression is identified in a query. The graph controller (128) may generate weights (136) for the edges (132) of the graph (130) based on the usage metrics (152). For example, the graph controller (128) may increase the weight of an edge when the count for a corresponding expression meets a threshold. Conversely, the graph controller (128) may decrease the weight of the edge when the count of a corresponding expression does not meet the threshold.

The data repository (102) may store one or more profiles (154, 156). Each profile (154, 156) may be associated with identifiers, such as a unique identifier (UID) that are unique to a client device (140), client applications (142), or users of the client device (140). Users may be individual persons, organizations, businesses, etc.

Profile (154) includes a profile rank (158) that may identify the strength of the influence of the profile (154) as compared to other profiles. For example, the profile rank (158) may be a multiplier that is applied to the usage metrics (152) when determining weights (136), the entities that correspond to nodes with higher source ranks have more influence than entities that correspond to nodes with lower profile ranks. For example, queries submitted from a profile having a higher profile rank may have a greater influence on the weight of an edge relative to profiles having a lower profile rank. Profile rank (158) may be a normalized metric based on, for example, a number of queries submitted for a corresponding profile.

While FIG. 1 shows a configuration of components, other configurations may be used without departing from the scope of the invention. For example, various components may be combined to create a single component. As another example, the functionality performed by a single component may be performed by two or more components.

Figure 2:
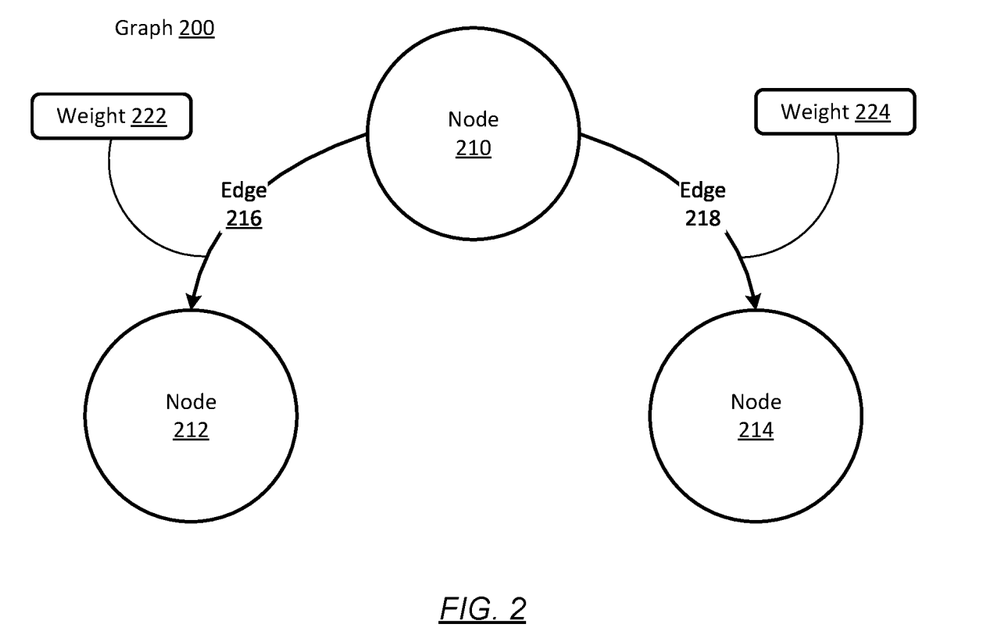
FIG. 2 shows an example of a graph in accordance with one or more embodiments of the invention.

Turning to FIG. 2, an example of a graph is shown according to one or more embodiments. In this illustrative example, node (210), node (212), and node (214) of the graph (200) are examples of the nodes (134) of the graph (130) of FIG. 1A. The edges (216, 218) are examples of the edges (132) of the graph (130) of FIG. 1A.

The nodes (210, 212, 214) of the graph (200) correspond to parameters identified in the query records, such as columns of relevant data and transformations that are applied to the data. The edges (216, 218) represent relationships between the nodes (210, 212) and nodes (210, 214), respectively.

The edge (216) represents relationship between node (210) and node (212), and includes the weight (222). The edge (218?) represents a relationship between node (210) and node (214), and includes the weight (224).

The weights (222, 224) represent the values of transactions between the node (210) and the nodes (212, 214). In one embodiment, the weights (222, 224) may be determined based on the usage metrics (152) and/or profile rank (158), both illustrated in FIG. 1B. For example, the weights (222, 224) may be set to the amounts of query transactions represented by the respective edges (216, 218). For example, the weight (222) may have a value that represents a number of query records that use the query statement of Example 1 shown above. The weight (224) may have a value that represents a number of query records that use the query statement of Example 2, shown above. In one embodiment, the weights (222, 224) may be adjusted according to profile ranks that may be associated with the queries.

Figure 3:
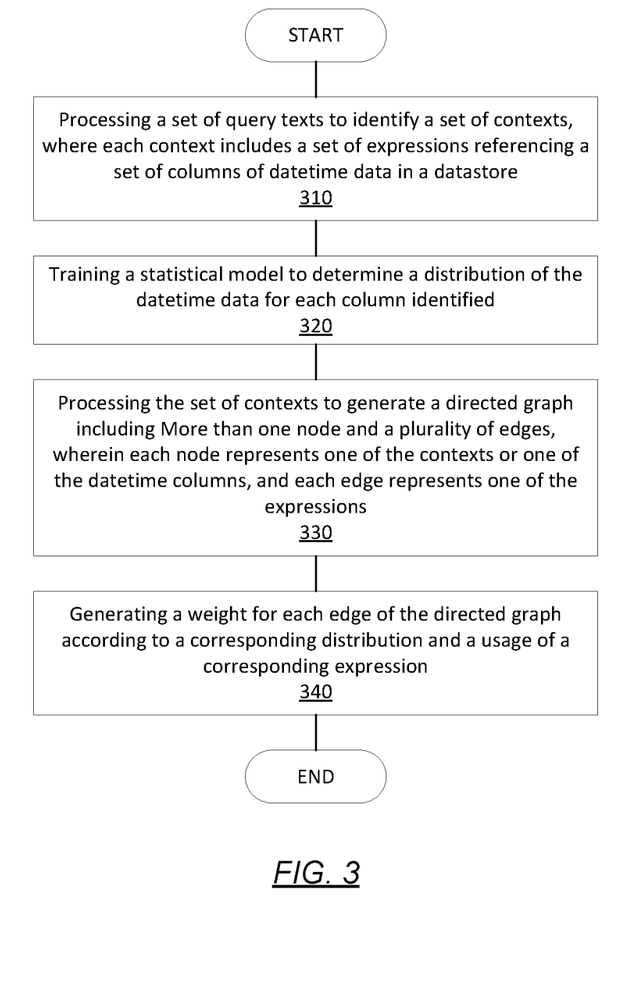
FIG. 3 shows a process for generating a graph in accordance with one or more embodiments of the invention.

Referring now to FIG. 3, a process for generating a graph is shown according to illustrative embodiments. The process of FIG. 3 can be implemented in one or more server applications, such as server applications (122) of FIG. 1B.

At step 310, a set of query records is processed to identify a set of expressions. Each expression may reference a set of columns of datetime data in a datastore. In some embodiments, the query records are generated when a query is received. The query may include a query expression and metadata. The query expression is stored without the metadata, for example in data repository (102) of FIG. 1A, from where the expression can be retrieved for processing Queries that are run by the user are parsed in the back end, for example, in a SQL integrated development environment, and stored as query record in a datastore. Each query record that is identified, excluding any associated metadata, can then be further parsed to identify query expressions that were previously run on the system. Relevant columns of the database can then be extracted according to queries that were run by the end user.

Relevant columns of datasets in the repository can be identified using the query expressions. In some embodiments, the set of query records is processed by identifying the set of columns based on a defined data format of the columns indicated in the set of query texts. For example, a column that is of type datetime or timestamp can be identified as a relevant column.

The system may look at the column name that is denoted in the query. Thus, in some embodiments, the set of query texts is processed by identifying the set of columns based on column names of the columns indicated in the set of query texts. For example, if a column name includes an indicative substring, such as time, daytime, or hour, as well as other time indicative substrings, the referenced column can be assumed to be a relevant column.

Once the datetime columns are extracted, the context surrounding these columns, i.e., operations performed by the query expression in order to parse or change the data in the column, is also identified. The context can include any operation or action that is performed on a column, as well as any expression surrounding a column, or expression that is connected to the column. For example, the context can be a combination of two columns, such as an offset, a sum of two or more columns, or a casting function.

At step 320, a statistical model is trained to determine a distribution of the datetime data for each column that was identified.

In some embodiments, the statistical model is a kernel density estimation model. The statistical model can be trained in parallel to gathering the user entered query data. The statistical model can be, for example, a kernel density estimation (KDE) model that calculates a probability distribution by taking millions of timestamp data points as input in order to train the statistical model.

For example, each event message received by the system includes a timestamp. Each event can be stored as a record in a table for the datasets. When a distribution is calculated for a particular column of data, each data in the distribution comprises a timestamp. Therefore, for example, even a dataset for a modest event-based environment that includes records for one million events will have a corresponding one million discrete timestamps.

The KDE model gives the density estimation, translating all of these events into a probability. The statistical model is a heuristic model that assumes the distribution of data to be biased to a local daytime. For every given time of the day, a heuristic-based probability can be generated for receiving an event during a corresponding local daytime.

In some embodiments, training the statistical model may include training a neural network with timestamps of data in the set of datetime columns to generate a kernel function including bandwidth and amplitude parameters for the kernel density estimation model At step 330, the set of expressions is processing to generate a directed graph including more than one node and a plurality of edges. Each node represents one of the columns or a transformation applied by one of the expressions to one of the columns. Thus, a first graph edge may define a relationship between two columns. A second graph edge may define a relationship between a column and some transformation that the user performs on the column without involving an additional database column.

For example, in some embodiments, different nodes of the graph database can represent different columns of data. In this example, edges connecting two nodes represent a relationship between two columns of data. The relationship can be to another column, i.e. to another column in the same table or in a separate table.

For example, given a relation between a first time stamp and the addition of seven hours, a first node representing a first column of timestamp data may be connected via the graph database to a second node representing a second column of data. The second column of data, which can include a label such as an offset, contains the transformation of +7 hours.

In another example, in some embodiments, different nodes of the graph database store the relation between a column of data and the time zone adjustment that was performed by the by the user. The relationship can be, for example, defined in static code that is written by the user to perform the adjustment.

For example, given a relation between a first time stamp and the addition of seven hours, a first node representing a first column of timestamp data may be connected via the graph database to a second node representing the addition of seven hours. The transformation of +7 hours would be defined in the connected node itself, according to expressions identified from the query records.

At step 340, weights are generated for edges of the directed graph according to a distribution of the datetime data in the columns and a usage index of a corresponding expression. The usage index takes advantage of large-scale systems having many users, wherein different query records submitted by different users can repeat the same logic, or use a different logic.

Records for the number of actions that were repeated are maintained in the usage metric, which can be used to incrementally increase the weight of the graph edges. For example, the first time a query logic is identified, the corresponding edge connection can be assigned a baseline weight. The baseline can be, for example, a unitary value (i.e., 1), or a normalized value based on a number of query records.

In some embodiments, weighting each edge according to the usage index further comprises for each edge, counting a number of unique users that submitted a query including the logic expressions.

As different users submit additional queries utilizing a same logic, the baseline weight is increased. For example, each unique user submitting using a same query logic may increment the weight up to a maximum value, (i.e., 10). Alternatively, the weight may be a normalized value that is increased based on a number of query records.

The graph that is generated can store multiple relationships for each node, thereby compensating for user mistakes and faulty query logic. For example, continuing with the +7-hour transformation example above, a first user submits a query that includes a transformation of +7 hours, a first graph edge for the +7-hour transformation is generated, and a baseline weight is assigned to the first edge. A second user submits a query that includes an erroneous transformation of +10 hours, a second graph edge for the +10-hour transformation is generated, and the baseline weight is assigned to the second edge.

Operating at scale, the system assumes that largest plurality of queries will utilize a correct transformation logic. As additional users submit queries that include +7-hour transformation, the weight of the first edge is increased to reflect a stronger connection to the +7-hour transformation. The edge with the highest score between any two connected nodes is selected for the time zone adjustment.

This system may set a specific threshold for the weight. When a weight meets this threshold, the corresponding transformation can be recommended to the user. This recommended adjustment can be integrated, for example, in a tool tip, or be documented offline in either scenario, the recommended adjustment can be actively presented to the end user to perform the recommended adjustment.

By storing multiple relationships for a node, this system self-compensates with a heuristic weighted system that is not merely deterministic. These multiple node relationships also enable the system to account for time changes, such as daylight savings, so that periodic shifts in local daytime are reflected in the edge weights of the generated graph.

Accounting for the time changes may involve taking snapshots of the system data, purging the graph periodically to avoid conflating time deltas before and after the time change. These snapshots could be taken at any acceptable time interval (e.g., daily, weekly, monthly, etc.) according to system usage.

In some embodiments, normalized scores are assigned to the users based on a respective query history of the user. For example, the system may give every user in the system a different profile rank, allowing a user that contributes frequently to the system, and is known to have a good reputation, to affect the edge weights by a greater amount. Conversely, a user that is considered to be new, for example, as determined by a minimum number of submitted queries, may be assigned a lesser profile rank. Weighting the edge of the graph is therefore differential according to the user reputation as determined by the rank scores. As a user runs more queries, the profile rank is increased, allowing for greater influence on edge weights.

In some embodiments, generating the weight for each edge of the directed graph includes, for each edge, determining a data shift for the distribution based on the logic expression. For example, the system can identify a maximum probability for receiving an event, and then correlate the petition to a time zone based on statistically determined heuristics. For example, for a user based in the United States, system may expect a peak time to be at 12:00 PM. This peak time is then used to determine a probable shift for timestamps recorded in the database, or a probable time zone for the user.

In some embodiments, a downstream process extracts data from the datetime columns according to the expression for an edge having a largest weight between nodes.

Figure 4:
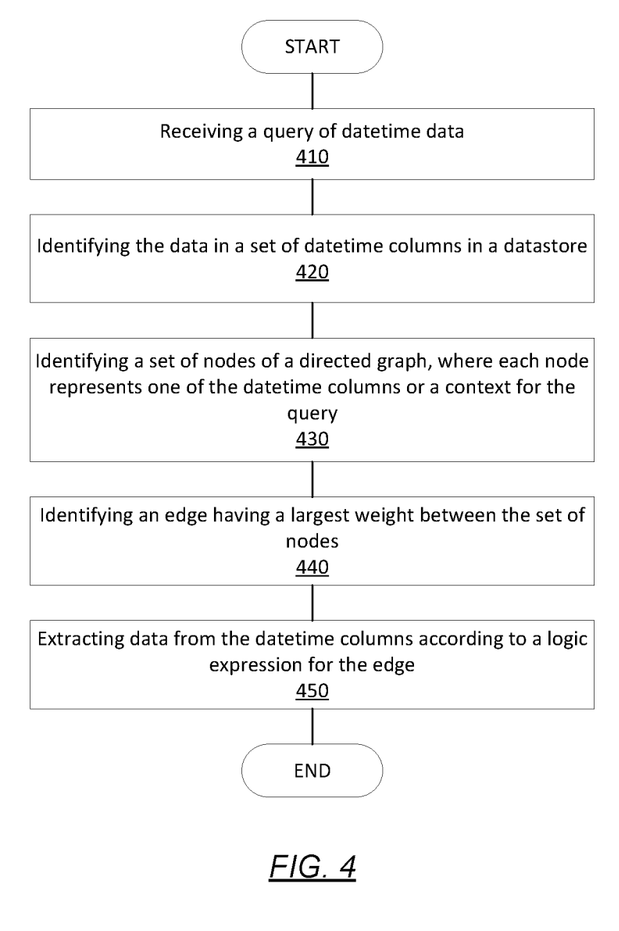
FIG. 4 shows a process for extracting data from a database in accordance with one or more embodiments of the invention.

Referring now to FIG. 4, a process for extracting data from a database is shown according to illustrative embodiments. The process of FIG. 4 can be implemented in one or more server applications, such as server applications (122) of FIG. 1A.

At step 410, a query of daytime data is received. In some embodiments, the query may include a query text and metadata. In some embodiments, the query text may be stored in a back-end database without the associated metadata.

In some embodiments, the query may include a timestamp, which can be used in training a neural network. Based on the timestamp, the neural network may update a kernel function, including bandwidth and amplitude parameters, for a kernel density estimation model.

At step 420, the data is identified in a set of datetime columns in a datastore. At step 430, a set of nodes is identified in a directed graph, where each node represents one of the datetime columns or a context for the query At step 440, an edge is identified having a largest weight between the set of nodes. In some embodiments, the weight may be adjusted based on the received query. For example, the system may identify a user that submitted the query. Based on the query and a query history of the user, the system may update a profile score of the users. The edge weights of the graph can then be updated according to the profile score At step 450, data is extracted from the datetime columns according to a logic expression for the edge. The process terminates thereafter.

While the various steps in the flowcharts are presented and described sequentially, at least some of the steps may be executed in different orders, may be combined or omitted, and at least some of the steps may be executed in parallel. Furthermore, the steps may be performed actively or passively.

The following example is for explanatory purposes only and not intended to limit the scope of the invention. Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The input devices may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   processing a set of query texts to identify a set of expressions, wherein each expression of the set of expressions identifies a set of columns of datetime data in a datastore, wherein each data in the datetime data comprises a timestamp;
   training a statistical model to generate a trained statistical model,
      wherein the statistical model is a kernel density estimation model that is adapted to train a neural network with the datetime data in the set of columns of datetime data to generate a kernel function, and
      wherein the kernel function includes bandwidth and amplitude parameters for the kernel density estimation model;
   determining, by the trained statistical model executing on a computer processor, a distribution of the datetime data for each column of datetime data that was identified, wherein the distribution of the datetime data is skewed to a local daytime;
   processing the set of expressions to generate a directed graph comprising a plurality of nodes and a plurality of edges, wherein each node represents one column of the set of columns of datetime data, or a transformation applied by one expression of the set of expressions to the one column of the set of columns of datetime data, and each edge represents a relationship between two nodes, wherein the relationship corresponds to an expression of the set of expressions or the one expression of the set of expressions; and
   generating a weight for each edge of the plurality of edges of the directed graph according to the distribution of the datetime data in the columns represented by the two nodes corresponding to each edge and a usage index of a corresponding expression of the set of expressions, comprising:
      for each edge of the plurality of edges, determining a data shift for the distribution of the datetime data in the columns represented by the two nodes corresponding to the edge based on the corresponding expression of the set of expressions;
      for each edge of the plurality of edges, counting a number of unique users that submitted a query including the corresponding expression of the set of expressions, and assigning normalized scores to the unique users based on respective query histories of the unique users to generate the usage index of the corresponding expression of the set of expressions; and weighting each edge of the plurality of edges according to the usage index and the data shift.

2. The method of claim 1, wherein a downstream process extracts data from the set of columns of datetime data according to an expression of the set of expressions for an edge having a largest weight between nodes.

3. The method of claim 1, further comprising:
receiving a query comprising a query text and metadata; and
storing the query text without the metadata.

4. The method of claim 1, wherein processing the set of query texts is selected from:
identifying the set of columns based on a defined data format of the set of columns of datetime data indicated in the set of query texts, and
identifying the set of columns based on column names of the set of columns of datetime data indicated in the set of query texts; and combinations thereof.

5. The method of claim 1, further comprising:
receiving a new query of datetime data;
identifying a user that submitted the new query;
updating a normalized score of the user based on the new query and a query history of the user;
identifying the datetime data corresponding to the new query in the set of columns of datetime data in the datastore;
identifying a set of nodes of the directed graph wherein each node of the set of nodes represents one column of the set of columns of datetime data or a context for the new query;
identifying an edge of the directed graph having a largest weight between the set of nodes to obtain a first edge;
extracting data from the set of columns of datetime data according to an expression for the first edge; and
updating the weight corresponding to the first edge according to the normalized score.

6. A system comprising:
a computer processor;
memory; and
instructions stored in the memory and executable by the computer processor to cause the computer processor to perform operations, the operations comprising:
processing a set of query texts to identify a set of expressions,
wherein each expression of the set of expressions identifies a set of columns of datetime data in a datastore, and
wherein each data in the datetime data comprises timestamps of data;
training a statistical model to generate a trained statistical model,
wherein the statistical model is a kernel density estimation model that is adapted to train a neural network with the timestamps of data in the set of columns of datetime data to generate a kernel function, and
wherein the kernel function includes bandwidth and amplitude parameters for the kernel density estimation model;
determining, by the trained statistical model, a distribution of the datetime data for each column of datetime data that was identified, wherein the distribution of the datetime data is skewed to a local daytime;
processing the set of expressions to generate a directed graph comprising a plurality of nodes and a plurality of edges, wherein each node represents one column of the set of columns of datetime data, or a transformation applied by one expression of the set of expressions to the one column of the set of columns of datetime data, and each edge represents a relationship between two nodes, the relationship corresponding to an expression of the set of expressions or the one expression of the set of expressions; and
generating a weight for each edge of the plurality of edges of the directed graph according to the distribution of the datetime data in the columns represented by the two nodes corresponding to each edge and a usage index of a corresponding expression of the set of expressions, comprising:
for each edge of the plurality of edges, determining a data shift for the distribution of the datetime data in the columns represented by the two nodes corresponding to the edge based on the corresponding expression of the set of expressions;
for each edge of the plurality of edges, counting a number of unique users that submitted a query including the corresponding expression of the set of expressions, and assigning normalized scores to the unique users based on respective query histories of the unique users to generate the usage index of the corresponding expression of the set of expressions; and
weighting each edge of the plurality of edges according to the usage index and the data shift.

7. The system of claim 6, wherein a downstream process extracts data from the set of columns of datetime data according to an expression of the set of expressions for an edge having a largest weight between nodes.

8. The system of claim 6, further comprising:
receiving a query comprising a query text and metadata; and storing the query text without the metadata.

9. The system of claim 6, wherein processing the set of query texts is selected from:
identifying the set of columns of datetime data based on a defined data format of the set of columns of datetime data indicated in the set of query texts,
identifying the set of columns of datetime data based on column names of the set of columns of datetime data indicated in the set of query texts, and combinations thereof.

10. The system of claim 6, wherein the operations further comprise:
receiving a query of datetime data;
identifying a user that submitted the query;
updating a normalized score of the user based on the query and a query history of the user;
identifying the datetime data in the set of columns of datetime data in the datastore;
identifying a set of nodes of the directed graph comprising a plurality of nodes and a plurality of edges, wherein each node of the set of nodes represents one column of the set of columns of datetime data or a context for the query;
identifying an edge from the plurality of edges of the directed graph having a largest weight between the set of nodes to obtain a first edge;

extracting data from the set of columns of datetime data according to an expression for the first edge; and updating the weight corresponding to the first edge according to the normalized score.

* * * * *